US012542387B2

(12) United States Patent
Morita

(10) Patent No.: US 12,542,387 B2
(45) Date of Patent: Feb. 3, 2026

(54) MULTI-POLE CONNECTOR

(71) Applicant: Murata Manufacturing Co., Ltd., Kyoto-fu (JP)

(72) Inventor: Yuuto Morita, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 306 days.

(21) Appl. No.: 18/336,849

(22) Filed: Jun. 16, 2023

(65) Prior Publication Data

US 2023/0335930 A1 Oct. 19, 2023

Related U.S. Application Data

(63) Continuation of application No. PCT/JP2021/032994, filed on Sep. 8, 2021.

(30) Foreign Application Priority Data

Dec. 23, 2020 (JP) ................................ 2020-214069

(51) Int. Cl.
*H01R 12/71* (2011.01)
*H01R 12/57* (2011.01)
(Continued)

(52) U.S. Cl.
CPC ........... *H01R 12/716* (2013.01); *H01R 12/57* (2013.01); *H01R 13/405* (2013.01); *H01R 13/6471* (2013.01)

(58) Field of Classification Search
CPC .... H01R 13/2407; H01R 12/57; H01R 12/58; H01R 12/7011; H01R 12/716; H01R 13/64; H01R 13/2442
See application file for complete search history.

(56) References Cited

U.S. PATENT DOCUMENTS 6,028,495 A * 2/2000 Umegaki ............... H03H 2/001
333/202
7,494,378 B1 * 2/2009 Peng ...................... H01R 12/73
439/607.01
(Continued)

FOREIGN PATENT DOCUMENTS

JP 2020-057499 A 4/2020
JP 2020-107472 A 7/2020
(Continued)

OTHER PUBLICATIONS

International Search Report issued in PCT/JP2021/032994; mailed Nov. 22, 2021.

*Primary Examiner* — Abdullah A Riyami
*Assistant Examiner* — Nelson R. Burgos-Guntin
(74) *Attorney, Agent, or Firm* — Studebaker Brackett PLLC

(57) ABSTRACT

A multi-pole connector from which noise is suppressed from leaking. The multi-pole connector to be mounted on a substrate having a mounting surface includes plural inner terminals, an outer terminal disposed so as to surround the plural inner terminals, an insulating member holding the outer terminal, and a ground conductor to be electrically connected to a ground potential of the substrate. The outer terminal has a gap exposing an outer side surface of the insulating member, and the ground conductor is disposed so as to overlap the gap formed in the outer terminal when viewed from the outer side surface side.

20 Claims, 12 Drawing Sheets

(51) Int. Cl.
*H01R 13/405* (2006.01)
*H01R 13/6471* (2011.01)

(56) References Cited

U.S. PATENT DOCUMENTS

| | | | | |
|---|---|---|---|---|
| 9,225,086 | B2 * | 12/2015 | Takeuchi | H01R 12/716 |
| 11,211,725 | B2 * | 12/2021 | Chen | H01R 13/6597 |
| 2011/0014800 | A1 * | 1/2011 | Cheng | H01R 12/716 439/55 |
| 2014/0004746 | A1 * | 1/2014 | Cartier, Jr. | H01R 43/20 439/626 |
| 2017/0195065 | A1 * | 7/2017 | Meier | H04B 10/802 |
| 2018/0205165 | A1 * | 7/2018 | Hoshiba | H01R 12/716 |
| 2018/0217341 | A1 * | 8/2018 | Smith | H01R 13/405 |
| 2019/0280409 | A1 * | 9/2019 | Hoshiba | H01R 12/716 |
| 2020/0006899 | A1 * | 1/2020 | Muro | H01R 13/6581 |
| 2022/0094110 | A1 * | 3/2022 | Okubo | H01R 13/652 |
| 2022/0140534 | A1 * | 5/2022 | Hoshiba | H01R 13/6461 439/74 |

FOREIGN PATENT DOCUMENTS

| | | | |
|---|---|---|---|
| WO | 2020/162548 | A1 | 8/2020 |
| WO | 2020/218385 | A1 | 10/2020 |

* cited by examiner

MULTI-POLE CONNECTOR

CROSS-REFERENCE TO RELATED APPLICATIONS

This application claims benefit of priority to International Patent Application No. PCT/JP2021/032994, filed Sep. 8, 2021, and to Japanese Patent Application No. 2020-214069, filed Dec. 23, 2020, the entire contents of each are incorporated herein by reference.

BACKGROUND

Technical Field

The present disclosure relates to a multi-pole connector.

Background Art

A multi-pole connector set constituted by a first connector and a second connector that are mated with one another has been known.

For example, International Publication No. 2020/218385 discloses a multi-pole connector set including a first connector including a first inner terminal and a first outer terminal and a second connector including a second inner terminal and a second outer terminal. When the first connector and the second connector are mated with one another, the first inner terminal and the second inner terminal are connected to one another, and the first outer terminal and the second outer terminal are connected to one another.

SUMMARY

The multi-pole connector set described in International Publication No. 2020/218385 is susceptible to improvement in view of suppression of noise leakage.

Thus, the present disclosure provides a multi-pole connector from which noise is suppressed from leaking.

A multi-pole connector according to the present disclosure is mounted on a substrate having a mounting surface, the multi-pole connector including plural inner terminals, an outer terminal disposed so as to surround the plural inner terminals, an insulating member holding the outer terminal, and a ground conductor to be electrically connected to a ground potential of the substrate. The outer terminal has a gap exposing an outer side surface of the insulating member, and the ground conductor is disposed so as to overlap the gap formed in the outer terminal when viewed from the outer side surface side.

The present disclosure can provide the multi-pole connector from which noise is suppressed from leaking.

DETAILED DESCRIPTION

Figure 1:
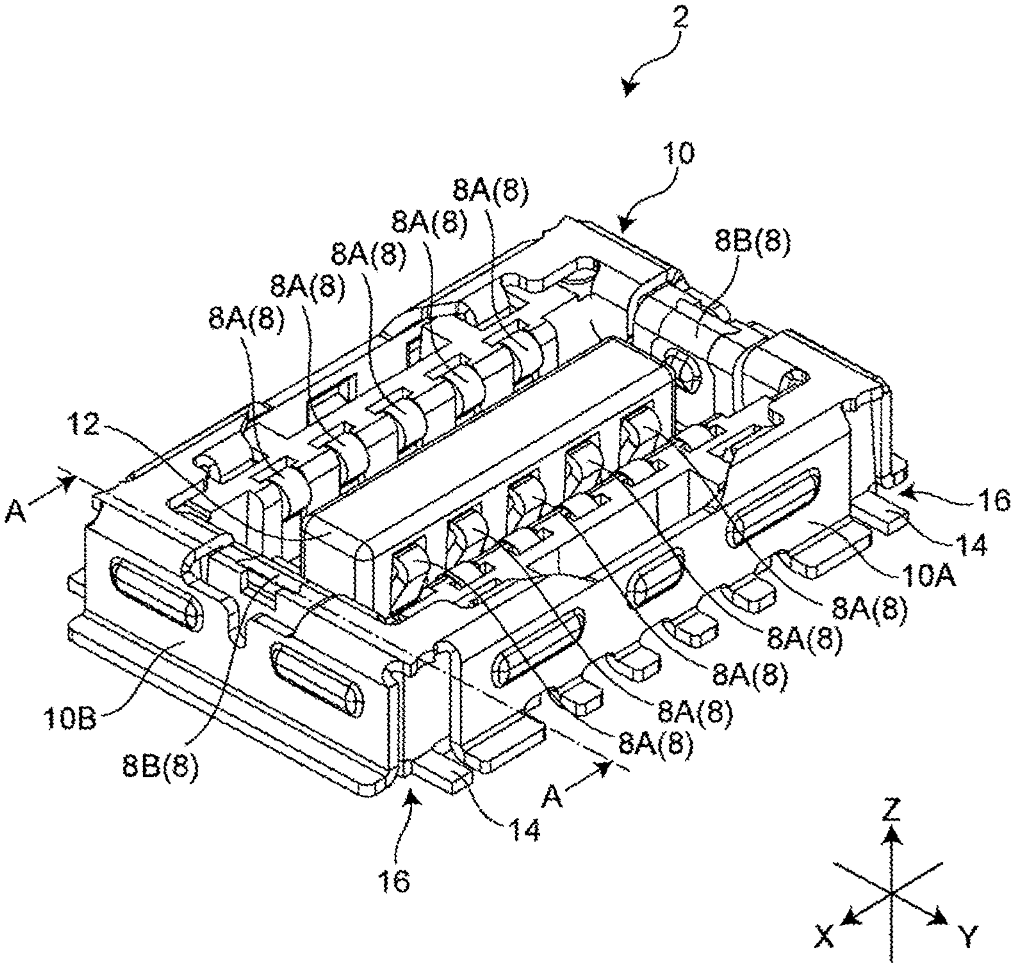
FIG. 1 is a perspective view of a first connector (multi-pole connector) according to a first embodiment.

According to a first aspect of the present disclosure, there is provided a multi-pole connector to be mounted on a substrate having a mounting surface, the multi-pole connector including plural inner terminals, an outer terminal disposed so as to surround the plural inner terminals, an insulating member holding the outer terminal, and a ground conductor to be electrically connected to a ground potential of the substrate. The outer terminal has a gap exposing an outer side surface of the insulating member, and the ground conductor is disposed so as to overlap the gap formed in the outer terminal when viewed from the outer side surface side.

According to such a configuration, noise can be suppressed from leaking outside the multi-pole connector from the gap of the outer terminal by the ground conductor being disposed in the gap of the outer terminal. When a high-frequency signal is transmitted, the characteristics of the multi-pole connector may be affected by noise leakage from the outer terminal. The ground conductor discharges noise to the ground potential of the substrate by being disposed in the gap of the outer terminal, and the noise can thereby be suppressed from leaking outside.

According to a second aspect of the present disclosure, there is provided the multi-pole connector according to the first aspect in which the ground conductor includes a ground connection portion to be connected to the ground potential of the substrate and a first extension portion extending, relative to the ground connection portion, in a first direction intersecting the mounting surface of the substrate.

According to such a configuration, the first extension portion can efficiently absorb noise from the inner terminals. The first extension portion can absorb noise, the ground connection portion can discharge the noise to the ground potential, and an effect of suppressing noise leakage can thereby be magnified.

According to a third aspect of the present disclosure, the ground connection portion of the ground conductor is disposed so as to extend through the gap of the outer terminal.

According to such a configuration, flexibility in substrate design can be increased.

According to a fourth aspect of the present disclosure, there is provided the multi-pole connector according to the second or third aspect in which the first extension portion of the ground conductor is embedded in the insulating member.

According to such a configuration, the first extension portion of the ground conductor is surrounded by the insulating member having a high permittivity. Thus, the first extension portion absorbs noise more easily, and the effect of suppressing noise leakage can be magnified.

According to a fifth aspect of the present disclosure, there is provided the multi-pole connector according to any one of the second to fourth aspects in which the ground conductor includes a second extension portion extending from an end of the first extension portion in a second direction intersecting the first direction.

According to such a configuration, the ground conductor can be prevented from coming off the insulating member.

According to a sixth aspect of the present disclosure, there is provided the multi-pole connector according to any one of the second to fifth aspects in which the first extension portion of the ground conductor has a larger width than the gap.

According to such a configuration, the effect of suppressing noise leakage from the gap of the outer terminal can further be magnified.

According to a seventh aspect of the present disclosure, there is provided the multi-pole connector according to any one of the first to fifth aspects in which the ground conductor has a length smaller than or equal to a quarter of a wavelength of a signal output from the plural inner terminals.

According to such a configuration, the effect of suppressing noise leakage can be magnified while the signal characteristics of the multi-pole connector are maintained.

According to an eighth aspect of the present disclosure, there is provided the multi-pole connector according to any one of the first to seventh aspects in which, when viewed in a direction perpendicular to the mounting surface of the substrate, the outer terminal has a shape having a long side and a short side, and the plural inner terminals include plural first inner terminals arranged in a direction in which the long side of the outer terminal extends.

According to such a configuration, the plural inner terminals can be arranged efficiently.

According to a ninth aspect of the present disclosure, there is provided the multi-pole connector according to the eighth aspect in which the gap is formed at an end portion of the long side of the outer terminal.

According to such a configuration, the ground conductor can be disposed at a place at which noise is likely to leak, and the effect of suppressing noise leakage can thereby be magnified.

According to a tenth aspect of the present disclosure, there is provided the multi-pole connector according to the eighth or ninth aspect in which the plural inner terminals include a second inner terminal serving as a signal terminal at a position facing the short side of the outer terminal in the long side direction, that is, the direction in which the long side of the outer terminal extends.

According to such a configuration, the signal characteristics of the connector can be improved by disposing a signal terminal for a high-frequency signal.

According to an eleventh aspect of the present disclosure, there is provided the multi-pole connector according to the tenth aspect in which, when viewed from the long-side side of the outer terminal, the ground conductor is disposed so as to overlap at least a portion of the second inner terminal and a portion of the gap.

According to such a configuration, the ground conductor easily absorbs noise related to the second inner terminal, and the signal characteristics can be improved.

Hereinafter, embodiments according to the present disclosure will be described in detail based on the drawings.

First Embodiment

Figure 2:
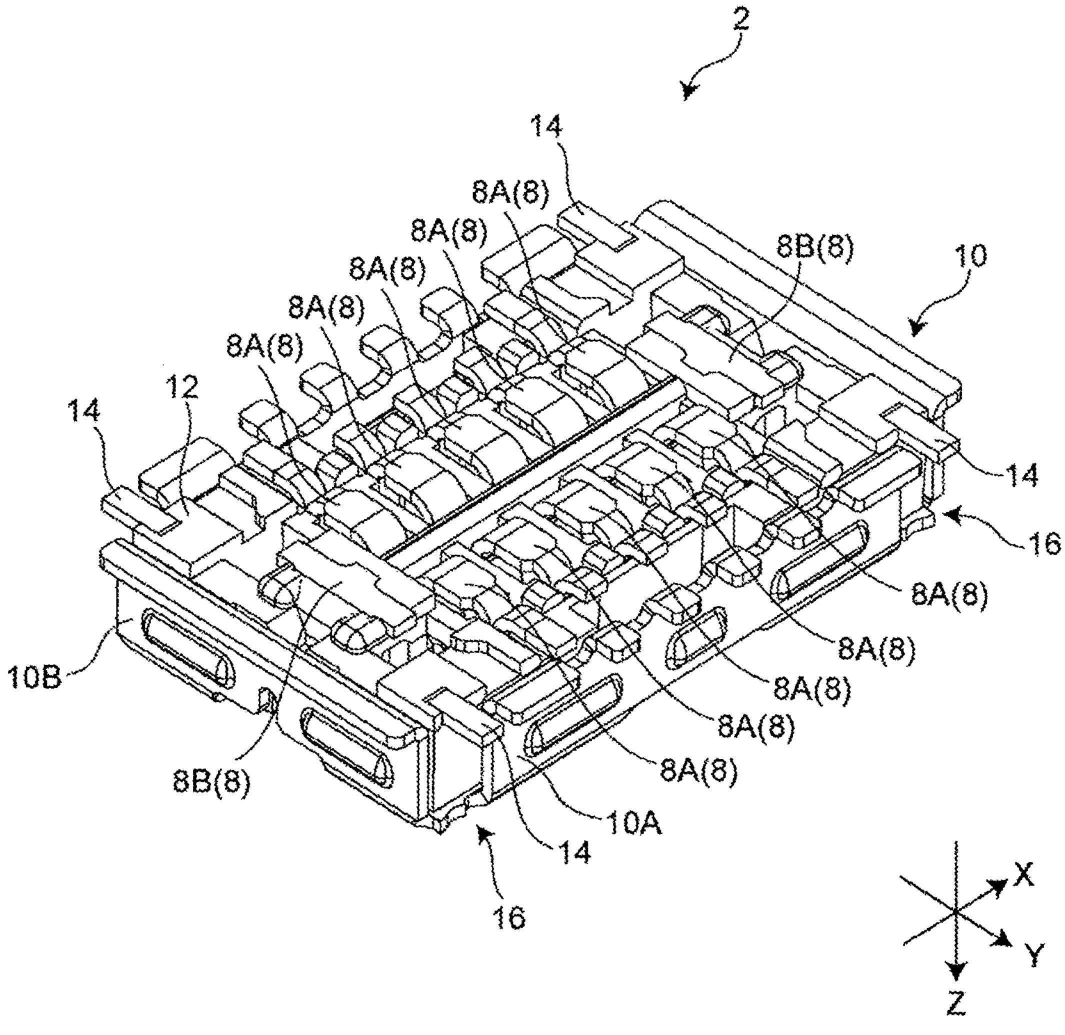
FIG. 2 is a perspective view of the first connector of FIG. 1 when viewed in a different direction.
Figure 3:
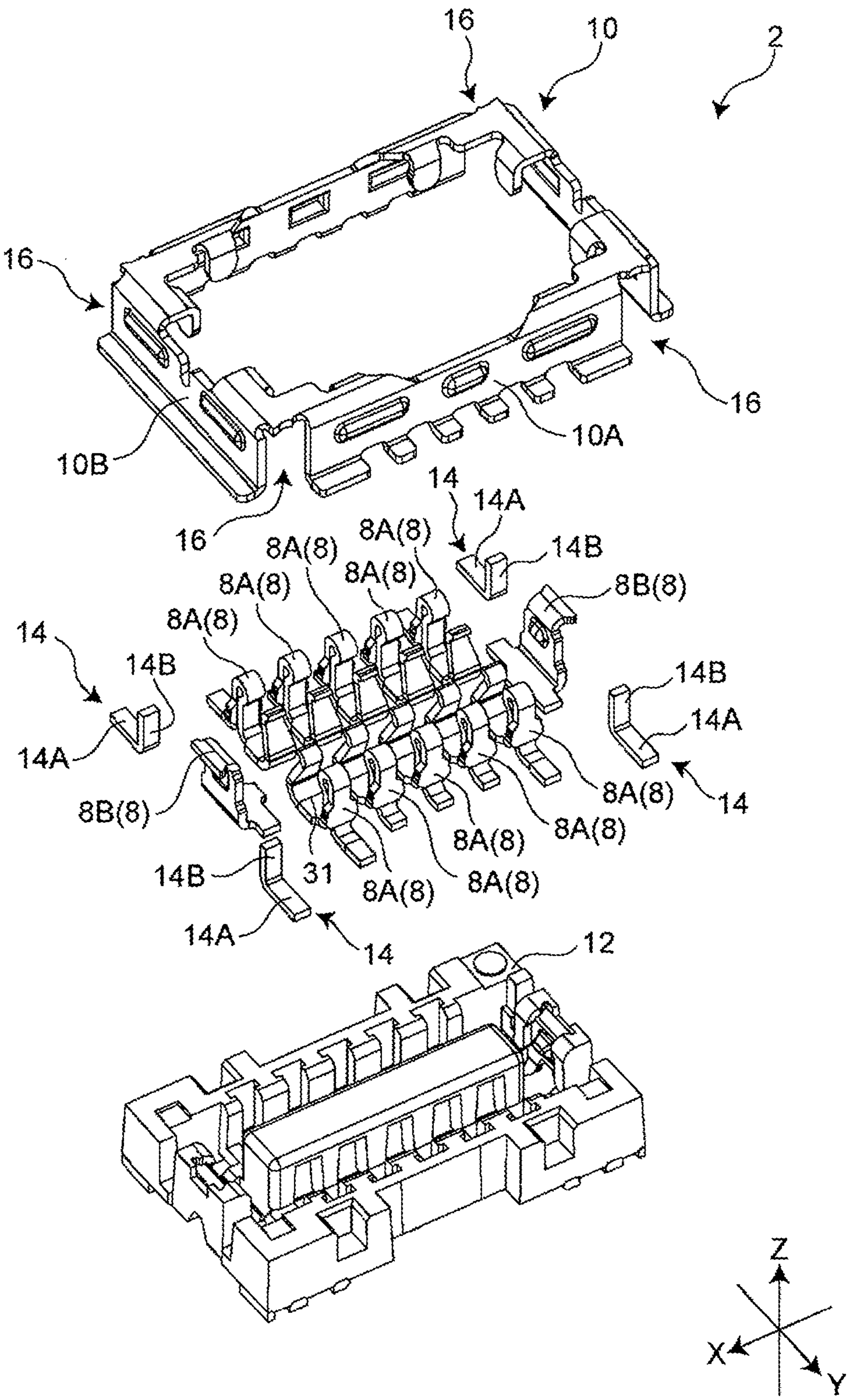
FIG. 3 is an exploded perspective view of the first connector of FIG. 1.
Figure 4:
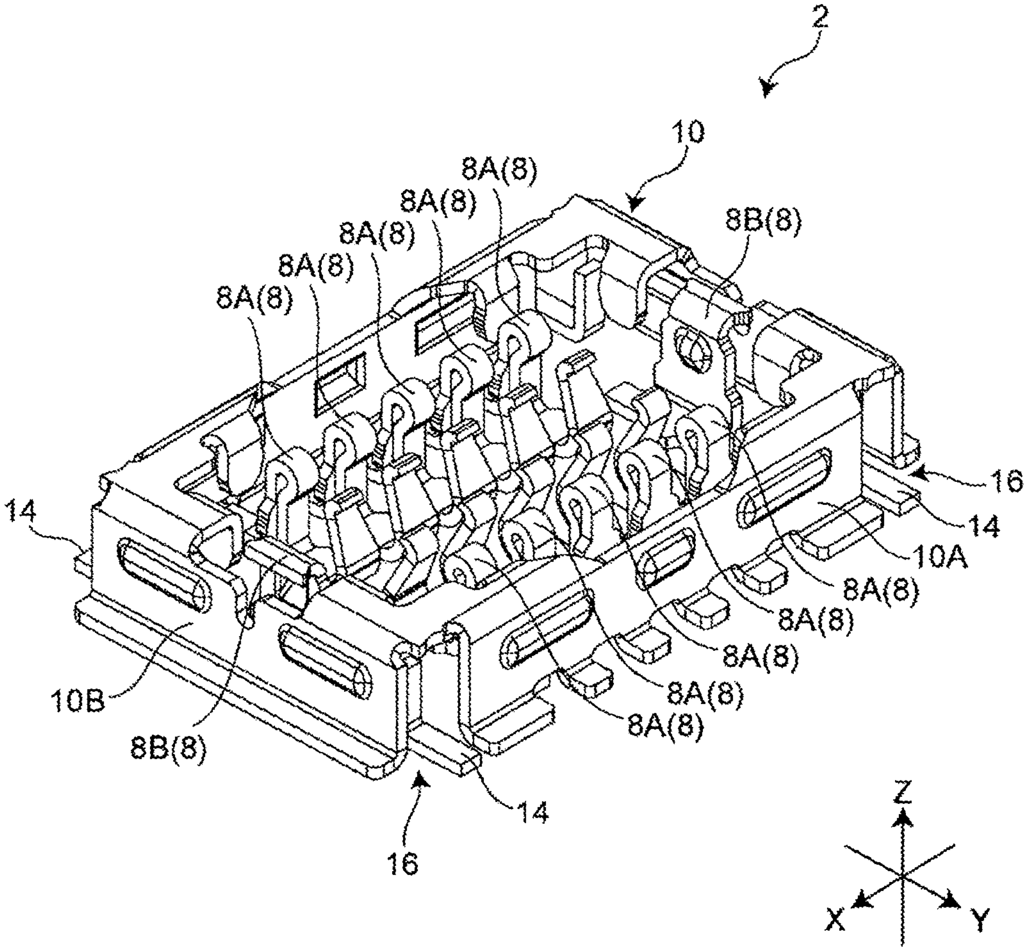
FIG. 4 is a perspective view of the first connector of FIG. 1 from which an insulating member thereof is omitted.
Figure 5:
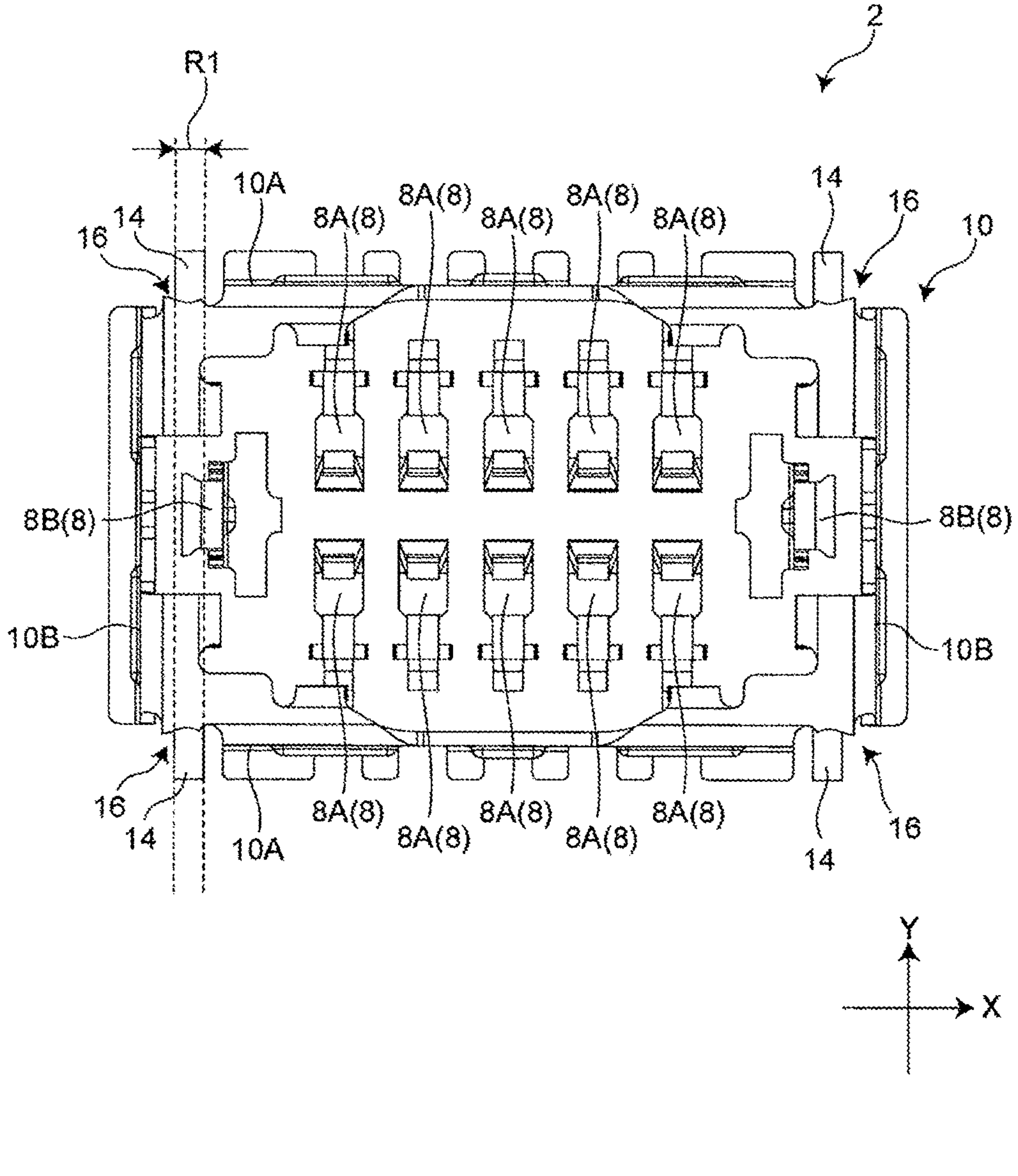
FIG. 5 is a plan view of the first connector of FIG. 1 from which the insulating member thereof is omitted, when viewed in a direction perpendicular to a mounting surface of a substrate.
Figure 6A:
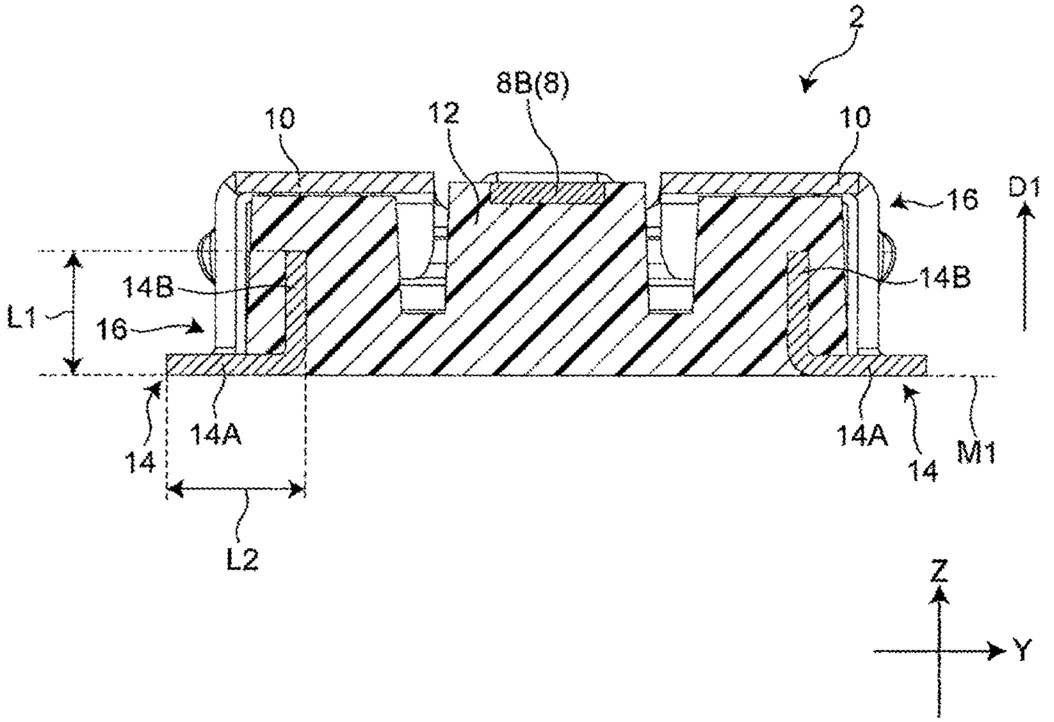
FIG. 6A is a sectional view of the first connector of FIG. 1 taken along line A-A.
Figure 6B:
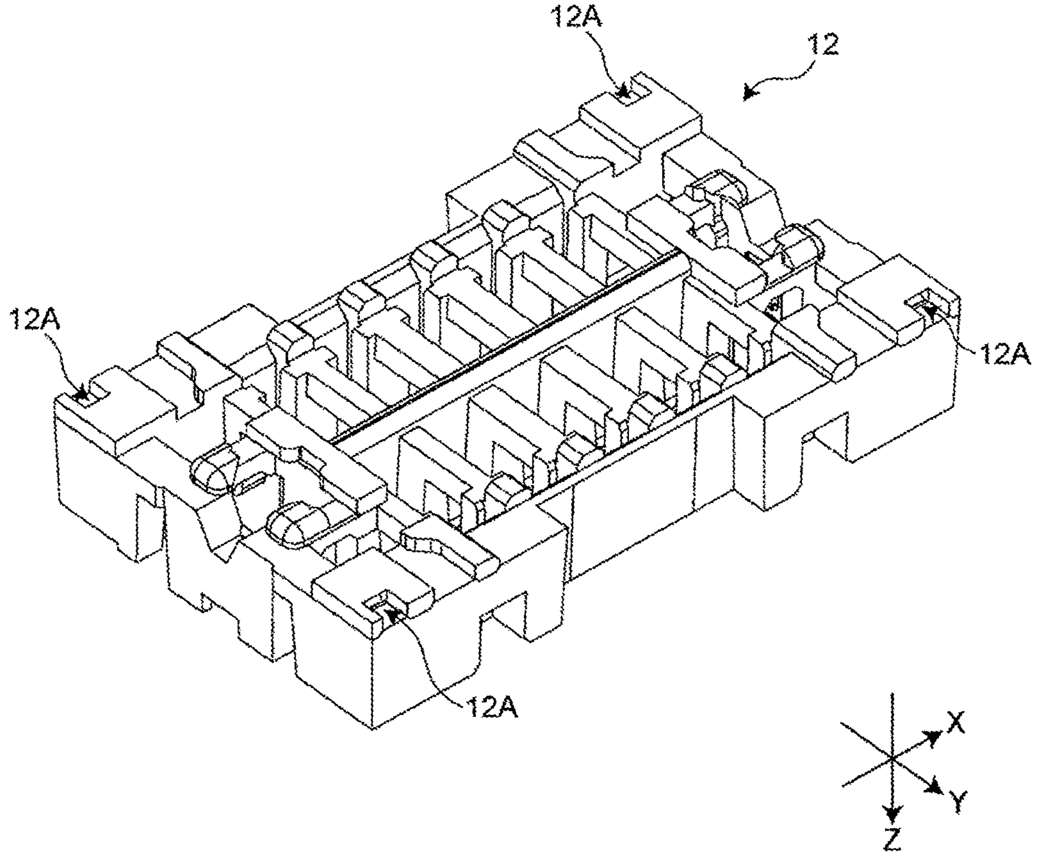
FIG. 6B is a perspective view of the structure of an insulating member of the first connector of FIG. 1.

FIG. 1 is a perspective view of a first connector 2 according to a first embodiment. FIG. 2 is a perspective view of the first connector 2 of FIG. 1 when viewed in a different direction. FIG. 3 is an exploded perspective view of the first connector 2 of FIG. 1. FIG. 4 is a perspective view of the first connector 2 of FIG. 1 from which an insulating member 12 thereof is omitted. FIG. 5 is a plan view of the first connector 2 of FIG. 1 from which the insulating member 12 thereof is omitted, when viewed in a direction perpendicular to a mounting surface M1 of a substrate (refer to FIG. 6A). FIG. 6A is a sectional view of the first connector 2 of FIG. 1 taken along line A-A. FIG. 6B is a perspective view of the structure of the insulating member 12 of the first connector 2 of FIG. 1.

Figure 7A:
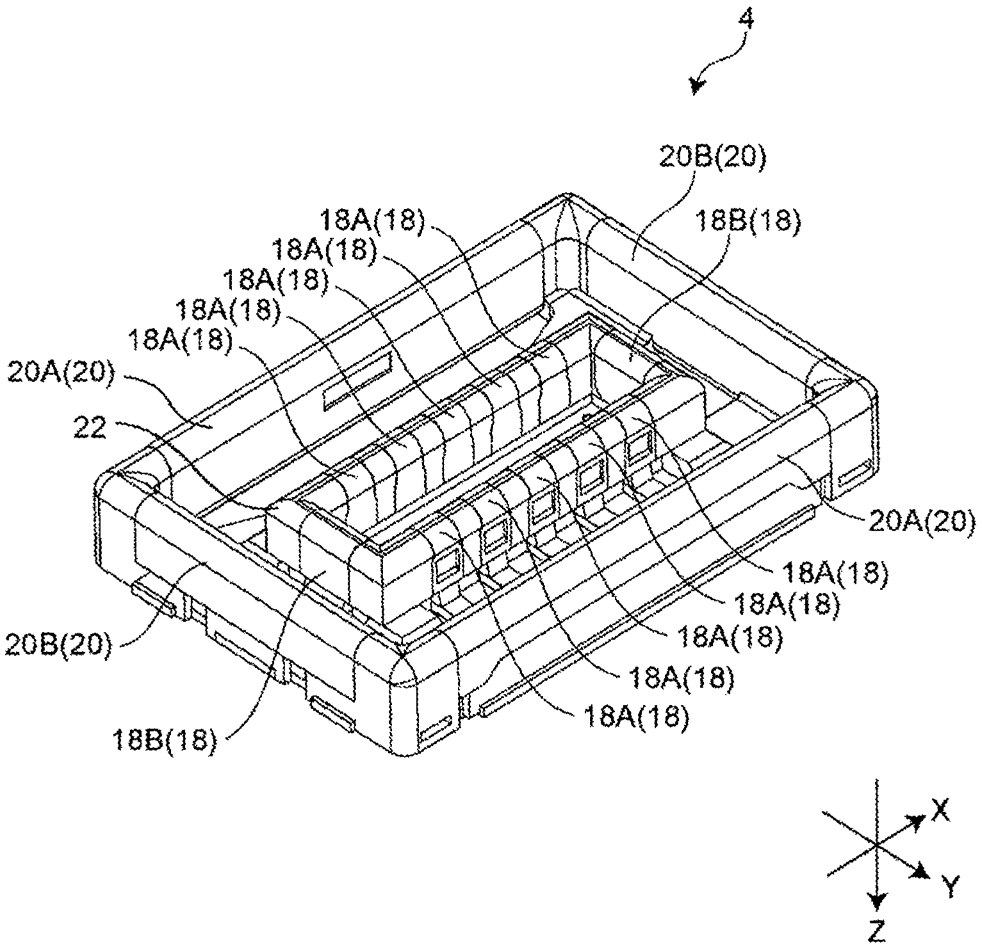
FIG. 7A is a perspective view of a second connector that is mated with the first connector of FIG. 1.
Figure 7B:
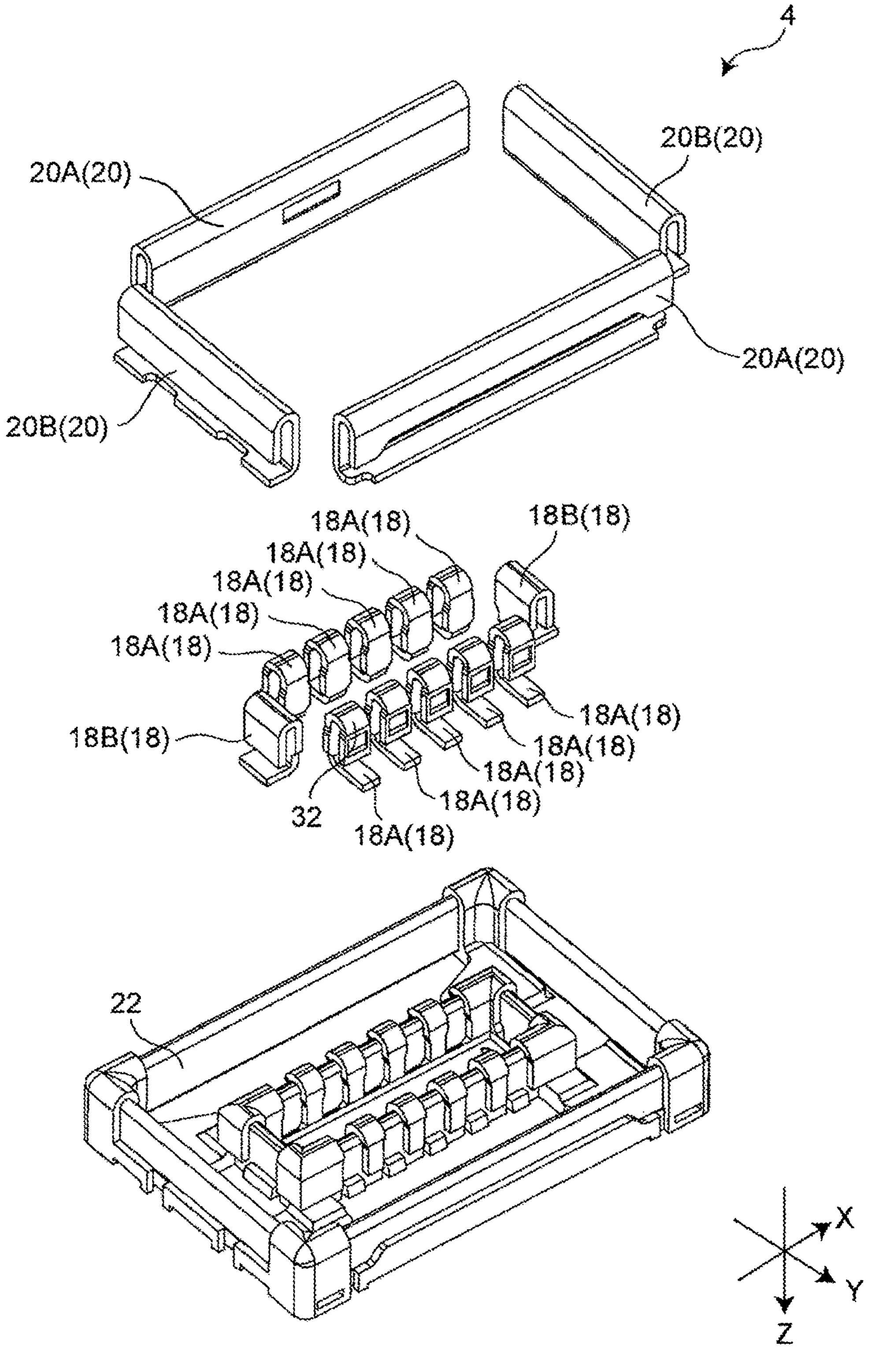
FIG. 7B is an exploded perspective view of the second connector of FIG. 7A.
Figure 8:
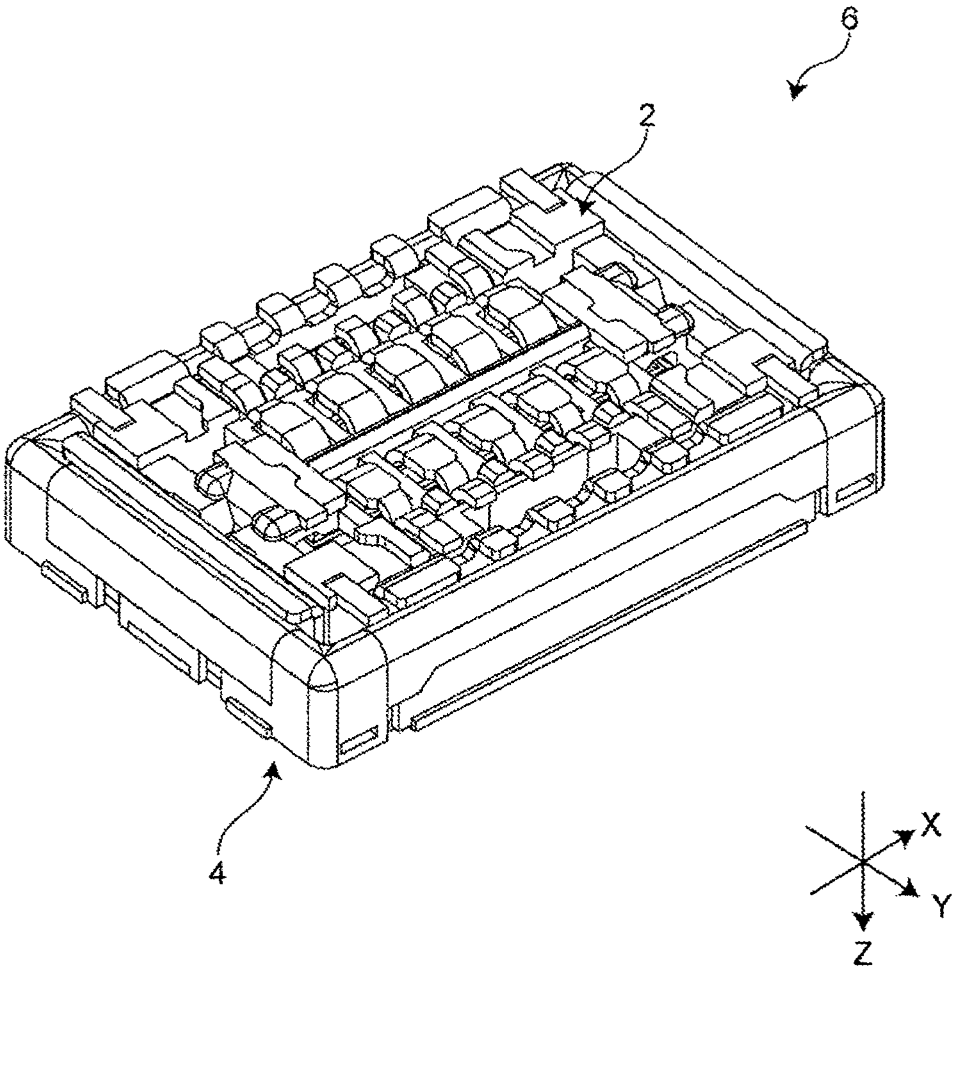
FIG. 8 is a perspective view of a multi-pole connector set constituted by the first connector of FIG. 1 and the second connector of FIG. 7.

FIG. 7A is a perspective view of a second connector 4 that is mated with the first connector 2 of FIG. 1. FIG. 7B is an exploded perspective view of the second connector 4 of FIG. 7A. FIG. 8 is a perspective view of a multi-pole connector set 6 constituted by the first connector 2 of FIG. 1 and the second connector 4 of FIG. 7.

In each of the figures, in the first connector 2, the X direction represents the length direction (longitudinal direction), the Y direction represents the width direction (lateral direction), and the Z direction represents the height direction (up-down direction) orthogonal to the longitudinal direction and the lateral direction.

The multi-pole connector set 6 illustrated in FIG. 8 is configured by the first connector 2 illustrated in FIGS. 1 to 5 and the second connector 4 illustrated in FIGS. 7A to 7B being mated with one another.

In the first connector 2, the upper surface side (the +Z direction) in FIG. 1 is mated with the second connector 4, which will be described later, and the upper surface side (the −Z direction) in FIG. 2 is mounted on the mounting surface M1 of the substrate (refer to FIG. 6A).

As FIGS. 1 to 3 illustrate, the first connector 2 includes plural inner terminals 8, an outer terminal 10, the insulating member 12, and a ground conductor 14.

The inner terminals 8 are mounted on the substrate (not illustrated) on which the first connector 2 is to be mounted. The plural inner terminals 8 are mated with and electrically connected to respective inner terminals 18 of the second connector 4, which will be described later. The inner terminals 8 include a first inner terminal 8A and a second inner terminal 8B.

Plural first inner terminals 8A are arranged in a direction (X direction) in which a long side of the outer terminal 10 extends. Specifically, each of the first inner terminals 8A extends, from the inner side toward the outer side of the multi-pole connector, in a direction along a short side 10B of the outer terminal 10, and the plural first inner terminals 8A are arranged along a long side 10A of the outer terminal 10. In other words, each of the first inner terminals 8A is disposed so as to extend toward the corresponding long side 10A of the outer terminal 10. In the present embodiment, there are two rows of five first inner terminals 8A. The plural first inner terminals 8A are electrically connected to, for example, signal lines or a ground potential of the substrate.

Each of the first inner terminals 8A is made of the same conductive material (for example, phosphor bronze). The first connector 2 is referred to as a "multi-pole" connector as the plural first inner terminals 8A are provided.

As FIG. 3 illustrates, each of the first inner terminals 8A is a female terminal. The first inner terminal 8A has a recess 31 that is mated with a protrusion 32 of a third inner terminal 18A illustrated in FIG. 7B.

The second inner terminal 8B is provided at a different position from the positions of the rows of the plural first inner terminals 8A. The second inner terminal 8B of the present embodiment is electrically connected to a signal line of the substrate and functions as a signal terminal. In the present embodiment, the second inner terminal 8B is disposed at each of the positions (on the +X side, on the −X side) facing the short sides 10B of the outer terminal 10. Specifically, the second inner terminals 8B extend, from the inner side toward the outer side of the multi-pole connector, in a direction along the long side 10A of the outer terminal 10. In other words, each of the second inner terminals 8B is disposed so as to extend toward the corresponding short side 10B of the outer terminal 10. The second inner terminal 8B may be partially embedded in the insulating member 12. In the present embodiment, one second inner terminal 8B is disposed at each of the positions facing the two short sides of the outer terminal 10. The second inner terminal 8B can serve as, for example, a signal terminal for a higher frequency (for example, not less than 10 MHz) than that of the first inner terminal 8A.

Each of the second inner terminals 8B is made of the same conductive material (for example, phosphor bronze) as the first inner terminals.

The outer terminal 10 is mated with and electrically connected to an outer terminal 20 of the second connector 4, which will be described later. The outer terminal 10 is a ground terminal to be connected to a ground potential of, for example, a substrate (not illustrated). The outer terminal 10 is disposed so as to surround the inner terminals 8 and functions as a shield that absorbs noise from the inner terminals 8 and discharges the noise to the ground potential.

In the present embodiment, the outer terminal 10 is a male terminal and is mated with the outer terminal 20, of the second connector 4, that is a female terminal.

The outer terminal 10 has a shape having the long side 10A and the short side 10B when viewed in the height direction (Z direction). In the outer terminal 10, the long side 10A constitutes a long-side side wall of the first connector 2, and the short side 10B constitutes a short-side side wall of the first connector 2. More specifically, the outer terminal 10 has two long sides 10A mutually facing one another and two short sides 10B mutually facing one another and has a substantially rectangular shape. There is a gap 16 between the long side 10A and the short side 10B adjacent to one another. The gap 16 is formed between the long side 10A and the short side 10B and functions as an exposure portion in which an outer side surface of the insulating member 12 is exposed. The outer terminal 10 can easily be fitted on the insulating member 12 by having the gap 16. In addition, with the gap 16, when an excessive stress is applied to the outer terminal 10, the load can be spread. As a result, the outer terminal 10 or the insulating member 12 can be prevented, for example, from being damaged. Thus, the gap 16 is preferably formed in a corner portion of the outer terminal 10.

In the present embodiment, the ground conductor 14 is provided to suppress a signal of the inner terminal 8 from leaking outside through the gap 16. The details will be described later.

In the present embodiment, as FIG. 5 illustrates, four gaps 16 are formed in the corner portions of the outer terminal 10. More specifically, the gap 16 is formed at each of both ends of the long side 10A of the outer terminal 10. With this disposition of the gap 16, the distance between the second inner terminal 8B facing the short side 10B and the gap 16 is increased to the greatest extent possible, and noise from the second inner terminal 8B can thereby be prevented from leaking outside from the gap 16. The position of the gap 16 is not limited to the corner portion of the outer terminal 10, and the gap 16 may be formed at any position according to the arrangement of the inner terminals 8.

The outer terminal 10 is made of the same conductive material (for example, phosphor bronze) as the first inner terminals 8A and the second inner terminals 8B.

As FIGS. 1 to 3 illustrate, the insulating member 12 holds, while insulating from one another, the first inner terminals 8A, the second inner terminals 8B, and the outer terminal 10. The insulating member 12 is made of, for example, a resin (for example, an insulating polymer) that is an insulating material.

Each of the ground conductors 14 is a conductor to be connected to the ground potential of the substrate (not illustrated). The ground conductor 14 has a function of absorbing noise from the inner terminals 8 and discharging the noise to the ground potential.

As FIG. 4 illustrates, the ground conductor 14 is disposed so as to extend through the gap 16 of the outer terminal 10. That is, the ground conductor 14 has a portion positioned on the inner side relative to the outer terminal 10 and another portion extending through the gap 16 of the outer terminal 10 and positioned on the outer side relative to the outer terminal 10. In the present embodiment, the outer terminal 10 has four gaps 16 (refer to FIG. 3), and four ground conductors 14 are thus also disposed. The ground conductors 14 are oriented in the same direction as the first inner terminals 8A.

By being arranged according to the gaps 16 as described above, the ground conductors 14 absorb noise and discharge the noise to the ground potential, and the noise can be suppressed from leaking from the gaps 16.

As FIGS. 1 to 5 illustrate, the ground conductors 14 are positioned near the second inner terminals 8B. The second inner terminals 8B serve as high-frequency signal terminals, thereby being more likely to generate noise than the first inner terminals 8A. The ground conductors 14 can easily absorb noise from the second inner terminals 8B by being positioned near the second inner terminals 8B. Thus, noise leakage of the first connector 2 can further be suppressed.

In addition, when viewed from the long-side side of the outer terminal 10 (in the Y direction), the ground conductor 14 is disposed so as to overlap at least a portion of the second inner terminal 8B and a portion of the gap 16 of the outer terminal 10. That is, as FIG. 5 illustrates, when, in the X direction, a region R1 represents a region in which the ground conductor 14 is disposed, at least a portion of the second inner terminal 8B and at least a portion of the gap 16 of the outer terminal 10 overlap the region R1. The ground conductor 14 can easily absorb noise from the second inner terminal 8B by being positioned as described above.

Each of the ground conductors 14 is made of the same conductive material (for example, phosphor bronze) as the inner terminals 8 and the outer terminal 10.

The shape of the ground conductor 14 will be described with reference to FIGS. 6A and 3.

The ground conductor 14 includes a ground connection portion 14A and a first extension portion 14B. The ground connection portion 14A is disposed along the mounting surface M1 of the substrate and mounted on a ground electrode of the substrate to be connected to the ground potential. The first extension portion 14B extends, relative to the ground connection portion 14A, in a first direction D1 intersecting the mounting surface of the substrate. In the present embodiment, the first direction D1 is a direction perpendicular to the mounting surface of the substrate (that is, a direction in which the connectors 2 and 4 are mated with one another). The first direction D1 is not necessarily perpendicular to the mounting surface as long as the first direction D1 intersects the mounting surface of the substrate.

Although, in the present embodiment, the ground connection portion 14A has a shape extending in one direction from the inner side to the outer side relative to the outer terminal 10 through the gap 16, the ground connection portion 14A may have a different shape according to the design of the substrate.

The ground conductor 14 can absorb signal noise from the inner terminals 8 in a wide-ranging manner by including the ground connection portion 14A extending in the Y direction and the first extension portion 14B extending in the Z direction, that is, having portions extending in different directions. In addition, the noise that has been absorbed can be discharged from the ground connection portion 14A to the ground potential of the substrate. As a result, the effect of suppressing noise leakage can be magnified.

When λ represents a wavelength of a signal of the inner terminal 8, the ground conductor 14 may preferably have a length smaller than or equal to λ/4. With the ground conductor 14 having such a length smaller than or equal to λ/4, the first extension portion 14B is prevented from absorbing signals other than noise, and the signal characteristics of the first connector 2 can thereby be suppressed from being degraded.

The length of the ground conductor 14 is defined as, for example, as FIG. 6A illustrates, a length L1 of the first extension portion 14B. The length of the ground conductor 14 may alternatively be defined as a length L2 of the ground connection portion 14A. Further, the length of the ground conductor 14 may alternatively be defined as a length that is the sum of the length L1 of the first extension portion 14B and the length L2 of the ground connection portion 14A. In the present embodiment, when λ represents a wavelength of the second inner terminal 8B, the length L1 of the first extension portion 14B is λ/4.

In the present embodiment, as FIGS. 6A and 6B illustrate, the first extension portion 14B is embedded in the insulating member 12. As FIG. 6B illustrates, a recess 12A for disposing the first extension portion 14B of the ground conductor 14 is formed in a portion of the insulating member 12 on the mounting surface M1 side. That is, in the ground conductor 14, the first extension portion 14B is disposed in the recess 12A of the insulating member 12. The first extension portion 14B is surrounded by the insulating member 12 by being disposed in the recess 12A of the insulating member 12. The ground conductor 14 can be suppressed from coming off the insulating member 12 by the first extension portion 14B being embedded in the insulating member 12 as described above. In addition, the first extension portion 14B absorbs noise more easily by being surrounded by the insulating member 12 having a higher permittivity than air.

As FIGS. 7A and 7B illustrate, the second connector 4 includes plural inner terminals 18, the outer terminal 20, and an insulating member 22 supporting the plural inner terminals 18 and the outer terminal 20. The second connector 4 is mounted on or in a different substrate from the substrate of the first connector 2.

The inner terminals 18 of the second connector 4 include the third inner terminals 18A and a fourth inner terminal 18B. The third inner terminal 18A is mated with and electrically connected to the first inner terminal 8A of the first connector 2. The fourth inner terminal 18B is mated with and electrically connected to the second inner terminal 8B of the first connector 2. Each of the inner terminals 18 is made of the same conductive material (for example, phosphor bronze).

As FIG. 7B illustrates, the third inner terminal 18A is a male terminal. The third inner terminal 18A has the protrusion 32 to be mated with the recess 31 of the first inner terminal 8A illustrated in FIG. 3.

The outer terminal 20 of the second connector 4 has a shape surrounding the plural inner terminals 18. In the present embodiment, the outer terminal 20 has long-side terminals 20A provided at two long sides of the second connector 4 and short-side terminals 20B provided at two short sides. The outer terminal 20 is a female terminal and is mated with the outer terminal 10, of the first connector, that is a male terminal.

The insulating member 22 holds, while electrically insulating from one another, the plural inner terminals 18 and the outer terminal 20 of the second connector 4. The insulating member 22 is made of, for example, a resin (for example, a liquid crystal polymer) that is an insulating material.

As FIG. 8 illustrates, the multi-pole connector set 6 is configured by the first connector 2 and the second connector 4 being mated with one another. The multi-pole connector set 6 constituted by the first connector 2 and the second connector 4 that are mated with one another also exhibits the noise suppression effect produced by the ground conductors 14.

As described above, the first connector 2 (multi-pole connector) of the present embodiment is a multi-pole connector to be mounted on the substrate having the mounting surface M1 and includes the plural inner terminals 8, the outer terminal 10, the insulating member 12, and the ground conductors 14. The outer terminal 10 is disposed so as to surround the plural inner terminals 8 and has the gaps 16 exposing the outer side surface of the insulating member 12. The insulating member holds the outer terminal 10. Each of the ground conductors 14 is electrically connected to the ground potential of the substrate and is disposed so as to overlap the corresponding gap 16 formed in the outer terminal 10 when viewed from the outer side surface side.

According to such a configuration, noise can be prevented from leaking outside the first connector 2 from the gap 16 of the outer terminal 10 by the ground conductor 14 being disposed in the gap 16 of the outer terminal 10.

The ground conductor 14 includes the ground connection portion 14A to be connected to the ground potential of the substrate and the first extension portion 14B extending, relative to the ground connection portion 14A, in the first direction D1 intersecting the mounting surface of the substrate.

According to such a configuration, the first extension portion 14B can efficiently absorb noise from the inner terminals 8.

The ground connection portion 14A of the ground conductor 14 is disposed so as to extend through the gap 16 of the outer terminal 10.

According to such a configuration, flexibility in substrate design can be increased.

The first extension portion 14B of the ground conductor 14 is embedded in the insulating member 12.

According to such a configuration, the first extension portion 14B of the ground conductor 14 is surrounded by the insulating member 12 having a high permittivity and thus easily absorbs noise. As a result, the effect of suppressing noise leakage can be magnified.

The ground conductor 14 has a length smaller than or equal to a quarter of a wavelength of a signal output from the inner terminals 8.

According to such a configuration, the effect of suppressing noise leakage can be magnified while the signal characteristics of the multi-pole connector are maintained.

When viewed in a direction perpendicular to the mounting surface of the substrate, the outer terminal 10 has a shape having a long side and a short side, and the plural inner terminals 8 include the plural first inner terminals 8A arranged in a direction in which the long side of the outer terminal 10 extends.

According to such a configuration, the plural inner terminals 8 can be arranged efficiently.

The gap 16 of the outer terminal 10 is formed at an end portion of the long side of the outer terminal 10.

According to such a configuration, the noise characteristics of the first connector 2 can be improved.

The plural inner terminals 8 include the second inner terminal 8B embedded in the insulating member 12 at a position facing the corresponding short side of the outer terminal 10 and serving as a signal terminal.

According to such a configuration, the signal characteristics of the first connector 2 can be improved by the second inner terminals 8B serving as high-frequency signal terminals.

When viewed from the long-side side of the outer terminal 10, the ground conductor 14 is disposed so as to overlap at least a portion of the second inner terminal 8B and a portion of the gap 16.

According to such a configuration, the ground conductor 14 easily absorbs noise related to the second inner terminal 8B, and the signal characteristics can be improved.

(First Modification)

Figure 9:
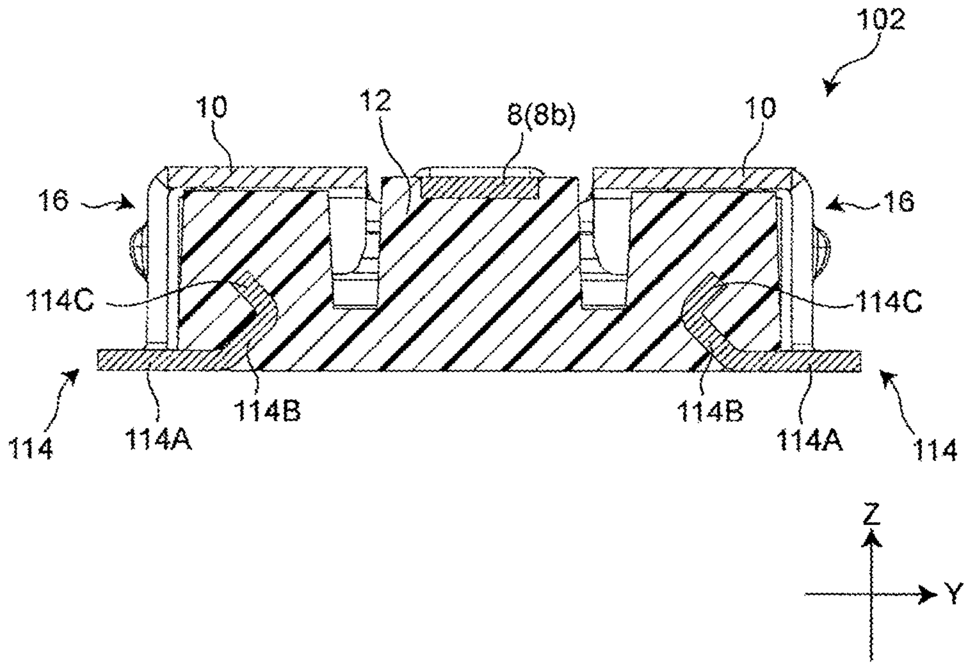
FIG. 9 is a sectional view of a first connector including a ground conductor of a first modification.
Figure 10:
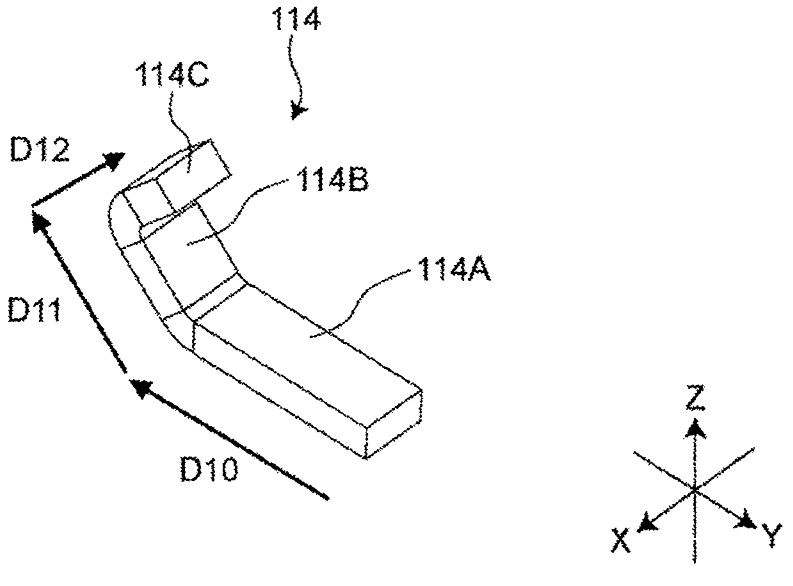
FIG. 10 is a perspective view of the ground conductor of FIG. 9.

A modification of the ground conductor 14 will be described with reference to FIGS. 9 to 10. FIG. 9 is a sectional view of a first connector 102 including a ground conductor 114 of a first modification. FIG. 10 is a perspective view of the ground conductor 114 of FIG. 9.

As FIGS. 9 and 10 illustrate, the ground conductor 114 includes a ground connection portion 114A, a first extension portion 114B, and a second extension portion 114C. The ground connection portion 114A extends in a direction D10, the first extension portion 114B extends in a first direction D11, and the second extension portion 114C extends in a second direction D12. Here, the direction D10 extends along the mounting surface of the substrate. The first direction D11 intersects the direction D10 and inclines so as to move away from the first extension portion 114*b*. The second direction D12 intersects the first direction D11 and inclines to the opposite side from the first direction D11. The second extension portion 114C extends in the second direction D12 from an end of the first extension portion 114B toward the gap 16 of the outer terminal 10.

The angle between the direction D10 extending along the mounting surface and the first direction D11 and the angle between the first direction D11 and the second direction D12 are not limited to the angles given in the figures and may be any angles.

In addition to the first extension portion 114B extending in the first direction D11, the second extension portion 114C extending in the second direction D12 is formed. The first extension portion 114B and the second extension portion 114C that extend in different directions are each embedded in the insulating member 12, thereby being able to be suppressed from coming off the insulating member 12.

(Second Modification)

Figure 11A:
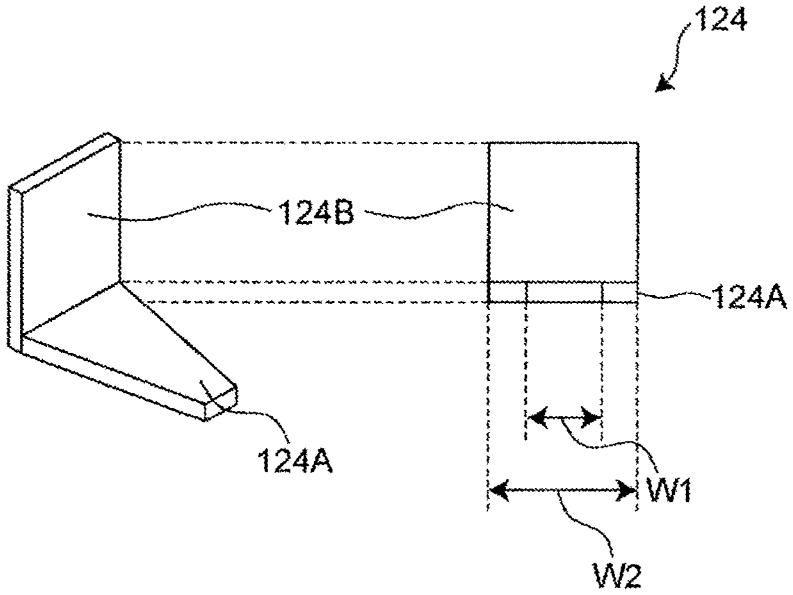
FIG. 11A includes a perspective view and a front view of a first extension portion of a ground conductor of a second modification.

FIG. 11A includes a perspective view and a front view of a first extension portion 124B of a ground conductor 124 of a second modification. In FIG. 11A, the perspective view of the ground conductor 124 is given at the left, and the front view of the ground conductor 124 is given at the right.

As FIG. 11A illustrates, the ground conductor 124 of the second modification includes a ground connection portion 124A and the first extension portion 124B. A width W2 of the first extension portion 124B of the ground conductor 124 is larger than the width of the gap 16 of the outer terminal 10 (refer to FIGS. 1 to 5). In this case, when viewed in a direction perpendicular to the mounting surface M1 of the substrate, the ground connection portion 124A has a trapezoidal shape. That is, a width W1 of an end of the ground connection portion 124A is smaller than the width W2 of a joint portion between the ground connection portion 124A and the first extension portion 124B.

The first extension portion 124B having such a large width can cover the gap 16 of the outer terminal 10 more reliably. Thus, the effect of suppressing noise leakage can be magnified.

(Third Modification)

Figure 11B:
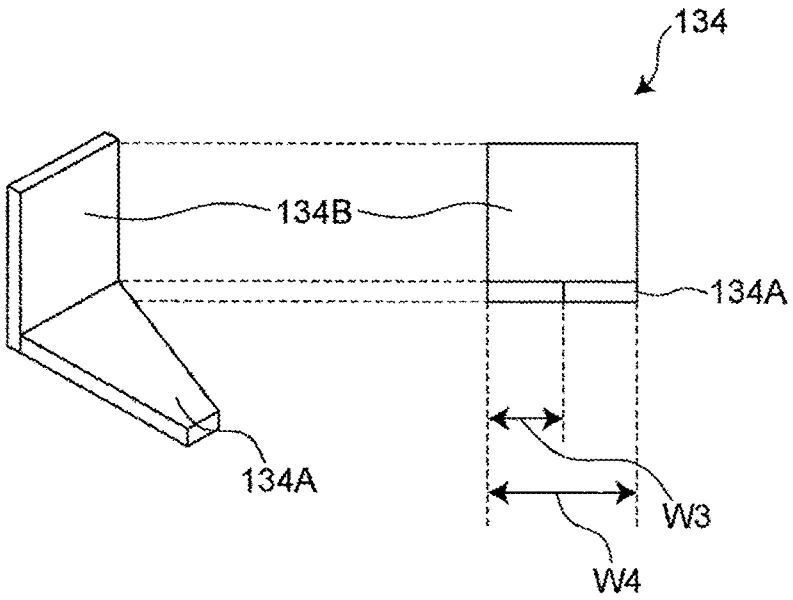
FIG. 11B includes a perspective view and a front view of a first extension portion of a ground conductor of a third modification.

FIG. 11B includes a perspective view and a front view of a first extension portion 134B of a ground conductor 134 of a third modification. In FIG. 11B, the perspective view of the ground conductor 134 is given at the left, and the front view of the ground conductor 134 is given at the right.

As FIG. 11B illustrates, the ground conductor 134 of the third modification includes a ground connection portion 134A and the first extension portion 134B. A width W4 of the first extension portion 134B of the ground conductor 134 is larger than the width of the gap 16 of the outer terminal 10 (refer to FIGS. 1 to 5). In this case, when viewed in a direction perpendicular to the mounting surface M1 of the substrate, the ground connection portion 134A has a trapezoidal shape. Unlike the case of the second modification, the shape of the ground connection portion 134A is asymmetrical.

In addition, the ground connection portions 124A and 134A illustrated in FIGS. 11A and 11B, respectively, are formed so that the widths thereof are gradually reduced from the first extension portions 124B and 134B. However, for example, the ground connection portion 124A and the first extension portion 124B are connected to one another while forming a crank-shaped portion therebetween, and the ground connection portion 134A and the first extension portion 134B are connected to one another while forming a crank-shaped portion therebetween.

Although, in the above-described embodiments, an example in which the ground conductor 14 is disposed in the first connector 2, which is a male connector, is described, the ground conductor may be disposed in any one of or each of the first connector 2 and the second connector 4.

Although, in the above-described embodiments, an example in which the ground conductor 14 is disposed so as to extend through the gap 16 of the outer terminal 10 is described, the ground conductor 14 is not necessarily disposed so as to extend through the gap 16 of the outer terminal 10. The ground conductor 14 may be disposed so as to overlap the gap 16 of the outer terminal 10 when viewed at least from the outer side surface side.

Although, in the above-described embodiments, an example in which the ground conductor 14 is oriented in the same direction as the inner terminal 8 (the first inner terminal 8A) is described, the ground conductor may be oriented in any direction depending on a substrate design.

Although, in the above-described embodiments, an example in which four gaps 16 are formed in the outer terminal 10, and four ground conductors 14 are disposed in the respective gaps 16 is described, each of the number of the gaps 16 and the number of the ground conductors 14 may be any number.

Although, in the above-described embodiments, an example in which the outer terminal 10 has a rectangular shape having a long side and a short side is described, the shape of the outer terminal 10 is not limited to such a rectangular shape. The outer terminal 10 may have a circular, oval, or polygonal shape.

While the present disclosure has been fully described in relation to the preferred embodiments with reference to the accompanying drawings, various modifications and alterations will be apparent to those skilled in the art. It should be understood that such modifications and alterations are also included within the scope of the present disclosure stated in the accompanying claims unless such modifications and alterations depart from the scope of the present disclosure. In addition, in each of the embodiments, change in combination and order of the constituents may be made without departing from the scope and the spirit of the present disclosure.

Note that an appropriate combination of any ones of the above-described various embodiments may exhibit effects produced by each of the combined embodiments.

The present disclosure is widely applicable to multi-pole connectors.

What is claimed is:

1. A multi-pole connector for mounting on a substrate having a mounting surface, the multi-pole connector comprising:

a plurality of inner terminals;

an outer terminal which surrounds the plurality of inner terminals, the outer terminal having two longitudinal sides mutually facing one another and two lateral sides mutually facing one another;

an insulating member holding the outer terminal; and a ground conductor spaced from the outer terminal and configured to electrically connect to a ground potential of the substrate, wherein the outer terminal has a gap between one of the longitudinal sides and one of the lateral sides adjacent to the one of the longitudinal sides, the gap exposing an outer side surface of the insulating member, and the ground conductor overlaps the gap in the outer terminal when viewed from the outer side surface side.

2. The multi-pole connector according to claim 1, wherein the ground conductor includes a ground connection portion configured to connect to the ground potential of the substrate and a first extension portion extending, relative to the ground connection portion, in a first direction intersecting the mounting surface of the substrate.

3. The multi-pole connector according to claim 2, wherein the ground connection portion of the ground conductor extends through the gap of the outer terminal.

4. The multi-pole connector according to claim 2, wherein the first extension portion of the ground conductor is embedded in the insulating member.

5. The multi-pole connector according to claim 2, wherein the ground conductor includes a second extension portion extending from an end of the first extension portion in a second direction intersecting the first direction.

6. The multi-pole connector according to claim 2, wherein the first extension portion of the ground conductor has a larger width than the gap.

7. The multi-pole connector according to claim 1, wherein the ground conductor has a length smaller than or equal to a quarter of a wavelength of a signal output from the plurality of inner terminals.

8. The multi-pole connector according to claim 1, wherein, when viewed in a direction perpendicular to the mounting surface of the substrate, the outer terminal has a shape having a long side and a short side, and the plurality of inner terminals includes a plurality of first inner terminals configured in a direction in which the long side of the outer terminal extends.

9. The multi-pole connector according to claim 8, wherein the gap is at an end portion of the long side of the outer terminal.

10. The multi-pole connector according to claim 8, wherein the plurality of inner terminals includes a second inner terminal configured as a signal terminal and facing toward the short side of the outer terminal in a direction in which the long side of the outer terminal extends.

11. The multi-pole connector according to claim 10, wherein when viewed from a side of the long side of the outer terminal, the ground conductor overlaps at least a portion of the second inner terminal and a portion of the gap.

12. The multi-pole connector according to claim 3, wherein the first extension portion of the ground conductor is embedded in the insulating member.

13. The multi-pole connector according to claim 3, wherein the ground conductor includes a second extension portion extending from an end of the first extension portion in a second direction intersecting the first direction.

14. The multi-pole connector according to claim 4, wherein the ground conductor includes a second extension portion extending from an end of the first extension portion in a second direction intersecting the first direction.

15. The multi-pole connector according to claim 3, wherein the first extension portion of the ground conductor has a larger width than the gap.

16. The multi-pole connector according to claim 4, wherein the first extension portion of the ground conductor has a larger width than the gap.

17. The multi-pole connector according to claim 5, wherein the first extension portion of the ground conductor has a larger width than the gap.

18. The multi-pole connector according to claim 2, wherein the ground conductor has a length smaller than or equal to a quarter of a wavelength of a signal output from the plurality of inner terminals.

19. The multi-pole connector according to claim 2, wherein, when viewed in a direction perpendicular to the mounting surface of the substrate, the outer terminal has a shape having a long side and a short side, and the plurality of inner terminals includes a plurality of first inner terminals configured in a direction in which the long side of the outer terminal extends.

20. The multi-pole connector according to claim 9, wherein the plurality of inner terminals includes a second inner terminal configured as a signal terminal and facing toward the short side of the outer terminal in a direction in which the long side of the outer terminal extends.

* * * * *